US009779902B2

(12) United States Patent
Martin et al.

(10) Patent No.: US 9,779,902 B2
(45) Date of Patent: Oct. 3, 2017

(54) CONFIGURABLE MODULAR INTELLIGENT ELECTRONIC OVERLOAD DEVICE AND SYSTEM WITH EMBEDDED PROGRAMMING TOOL

(71) Applicants: William H. Martin, Franklin, WI (US); Eric Norrod, Milwaukee, WI (US); Eric M. Waydick, Milwaukee, WI (US); Theron Kotze, Milwaukee, WI (US); James J Flood, Milwaukee, WI (US); Keith D Carter, Hendersonville, NC (US)

(72) Inventors: William H. Martin, Franklin, WI (US); Eric Norrod, Milwaukee, WI (US); Eric M. Waydick, Milwaukee, WI (US); Theron Kotze, Milwaukee, WI (US); James J Flood, Milwaukee, WI (US); Keith D Carter, Hendersonville, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 790 days.

(21) Appl. No.: 14/078,196

(22) Filed: Nov. 12, 2013

(65) Prior Publication Data

US 2015/0131185 A1    May 14, 2015

(51) Int. Cl.
*G06F 3/00* (2006.01)
*H02H 3/00* (2006.01)
(Continued)

(52) U.S. Cl.
CPC ....... *H01H 71/00* (2013.01); *H01H 2071/006* (2013.01); *H02H 3/006* (2013.01); *H02H 7/0822* (2013.01)

(58) Field of Classification Search
CPC .................. Y02B 70/3225; Y10T 307/878
See application file for complete search history.

(56) References Cited

U.S. PATENT DOCUMENTS

| 6,880,015 B1* | 4/2005 | Siders ................... H04L 29/06 370/464 |
| 2005/0057870 A1* | 3/2005 | Stellato ............... H02H 1/0061 361/66 |

(Continued)

FOREIGN PATENT DOCUMENTS

EP       2012156207 A1    11/2012

OTHER PUBLICATIONS

European Search Report; Appln. No. EP 14 19 1645; 8 pages; dated May 27, 2015.
Allen-Bradley DiviceLogix System User Manual; Feb. 2010.

*Primary Examiner* — Hyun Nam
(74) *Attorney, Agent, or Firm* — Quarles & Brady LLP

(57) ABSTRACT

A modular intelligent electronic overload device that requires only a single configuration file to describe the device with all of the available options. Furthermore, the modular intelligent electronic overload device contains embedded application files that provide commonly used control algorithms into the non-volatile memory of the modular intelligent electronic overload device that can be accessed by a user to configure the device without the need for a personal computer. Finally, the modular intelligent electronic overload device configuration parameters can be stored to virtual non-volatile memory contained in an associated user interface device, allowing for easy replacement of the modular intelligent electronic overload device.

19 Claims, 5 Drawing Sheets

(51) Int. Cl.
*H01H 71/00* (2006.01)
*H02H 7/08* (2006.01)

(56) References Cited

U.S. PATENT DOCUMENTS

| | | | |
|---|---|---|---|
| 2006/0049694 A1* | 3/2006 | Kates | H02J 3/14 307/132 E |
| 2006/0052906 A1* | 3/2006 | Kates | H04L 47/10 700/295 |
| 2007/0121265 A1 | 5/2007 | Hill, III et al. | |

* cited by examiner

CONFIGURABLE MODULAR INTELLIGENT ELECTRONIC OVERLOAD DEVICE AND SYSTEM WITH EMBEDDED PROGRAMMING TOOL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The subject matter disclosed herein relates generally to overload relays, and, more particularly, to a modular electronic overload device adapted to allow for easier commissioning and replacement.

Overload relays are current sensitive relays that can be used to disconnect power from equipment when an overload or other sensed condition exists. They are normally used in conjunction with an electromechanical contactor, and are designed to protect an electric motor or other electronic devices.

In a typical installation, the contactor provides three contacts, one associated with each of up to three phases of power, that are closed by an electromagnetically operated contactor coil. The overload relay includes current sensing elements that are wired in series with the three phases passing through the contactor to the motor. In this way, the overload relay can monitor current flowing in the three phases through the contactor, and based on current magnitude and duration, may interrupt the current flow through the contactor coil circuit to open the contactor contacts when an overload occurs. For this purpose, the overload relay includes a contact or contacts that can be used to control the contactor coil and/or provide a signal indicating an overload or other sensed condition.

One difficulty associated with overload relays in general is the complexity in commissioning a motor control panel where multiple motor control circuits are required. Today there are two common installation methods. One installation method is to have each motor starter in an individual compartment. The second method is to mount multiple motor starters side by side in one enclosure. After the motor starters are mounted and wired, a system integrator has the responsibility to configure each intelligent electronic overload device. As motor control devices have become more sophisticated, the level of complexity involved in configuring each intelligent electronic overload device to match up to an associated motor system has become quite challenging. A system integrator may be required to configure a local human-machine interface device (hereinafter "HMI"), and/or a network device to properly configure an intelligent electronic overload device. To perform the required configuration, the system integrator may require a personal computer. Due to the complexity associated with configuring multiple parameters, configuration of a single intelligent electronic overload device task could take hours. Furthermore, after the intelligent electronic overload device itself is properly configured, the system integrator may then need to establish communications between the intelligent electronic overload device and a networked system such as an automation control system, resulting in more time expended to fully configure the intelligent electronic overload device. Finally, due to the different types of communication networks available in the market, each deployment may require additional configuration or special wiring, further increasing the amount of time required to commission a motor control system and/or the potential for human error.

Additionally, another difficulty associated with intelligent electronic overload devices is the time required to configure a replacement intelligent electronic overload device. Currently, maintenance personnel often require access to a personal computer in order to configure a replacement intelligent electronic overload device, to which they may not have immediate access to when needed. Lack of access to a properly configured personal computer, combined with the above mentioned difficulty associated with configuring complex intelligent electronic overload devices, can result in unnecessary downtime as well as lost production time when an intelligent electronic overload device must be replaced.

Another difficulty associated with intelligent electronic overload devices in general is the large number of catalog numbers that need to be manufactured and warehoused. Typically, an overload device is designed for only a limited current range, and, possibly, a limited, fixed set of functional options. If you are a manufacturer, you want to offer a full product line, which means offering a large variety of overload relays that operate at their respective currents. Thus, an integrator or an original equipment manufacturer ("OEM") using overload relays needs to have a large selection of overload relays available to meet the needs of the designed application. Attempts to accommodate overload relays to operate in a wider range of applications can result in increased size, cost, and heat generation. Similarly, intelligent electronic overload devices with many available options have multiple product configuration files to identify the specific options that were selected for that system. This could result in thousands of different configuration files which can be very difficult to manage. A large number of different configuration files can also create significant complexity for the creation of collateral application software as well.

For example, intelligent devices may require configuration files such as Electronic Data Sheet (hereinafter "EDS") files in order to be used in an intelligent system. These EDS files are generally created to correspond with each catalog number. Where there may be a large number of catalog numbers, such as when a separate catalog number is needed to address multiple options and parameters, this would result in a equally large number of EDS files. These files must first be created, consuming valuable resources. Furthermore, these files are often obtained by the end user via an electronic download. Where a large number of EDS files exists, an end user may have to spend a significant amount of time searching for the EDS file that correspond to a particular intelligent device. Additionally, where a large number of catalog numbers exist, multiple software application profiles, such as "Add On Instructions" used in an environment such as RSLOGIX, or "Faceplates" required when interfacing to a visualization device 118 such as a PANELVIEW product from Rockwell Automation, may also be required.

Finally, current intelligent devices such as intelligent electronic overload devices can often be used as remote control modules. This allows a user to utilize the power of the devices to configure the I/O on the device for specific applications. This is often done using an industrial automation programming architecture such as RSLOGIX from Rockwell Automation. However, this often required a sophisticated user with a programming device, such as a personal computer with the necessary programming software, to program the intelligent device. However, often the devices were configured to correspond with commonly used application configurations. In these instances, the ability for a user to quickly configure an intelligent device such as an intelligent electronic overload device for a common application could significantly reduce installation and commissioning time for industrial automation systems.

There is a need, therefore, for a modular overload relay assembly that can be easily configured with or without a personal computer when installing or replacing an intelligent electronic overload device. Furthermore, there is a need for an intelligent electronic overload device to have a single configuration file, such as an EDS file, with a common set of user-selectable parameters contained within the intelligent electronic overload device. Finally, there is a need to have an intelligent electronic overload device that can have embedded software function blocks that a user can select to place the device into a desired operational mode without a user being required to program the device, as has been done traditionally.

BRIEF DESCRIPTION OF THE INVENTION

The present embodiments overcomes the aforementioned problems by providing a modular intelligent electronic overload device that requires only a single configuration file to describe the device with all of the available options. Furthermore, the modular intelligent electronic overload device contains embedded application files that provide commonly used control algorithms into the non-volatile memory of the modular intelligent electronic overload device that can be accessed by a user to configure the device without the need for a personal computer. Finally, the modular intelligent electronic overload device configuration parameters can be stored to virtual non-volatile memory contained in an associated user interface device, allowing for easy replacement of the modular intelligent electronic overload device.

Embodiments of the present invention include an integrated function block technology, a single EDS file technology, and an off-board memory storing the configuration parameters.

Accordingly, embodiments of the above technologies include a modular intelligent overload system. The system comprises a control module and a communication module; the control module having a memory device, the memory device containing a plurality of function blocks; the communication module in electrical communication with the control module; and the communication module additionally in electrical communication with a configuration tool, wherein the configuration tool is used by a user to select a single function block from the plurality of function blocks. The embodiment further comprising an external memory device, the external memory device capable of storing the function blocks stored in the control module memory device. In a further embodiment, the external memory device is located on a user interface device electrically coupled to the electronic overload device.

In accordance with another embodiment of the invention, embodiments of the present invention include a modular intelligent electronic overload system. The system comprises a control module, a communication module and a configuration tool. The control module having a memory device, the memory device comprising a configuration file and a plurality of status bits; the communication module in electrical communication with the control module; and the configuration tool having an interface allowing a user to select at least one of a plurality of parameters, wherein the configuration tool sets the plurality of status bits to correspond with the at least one of the plurality of parameters selected by the user. The embodiment further comprising an external memory device, the external memory device capable of storing an identical copy of the plurality of parameters stored in the control module memory device. In a further embodiment, the external memory device is located on a user interface device electrically coupled to the electronic overload device.

In accordance with another embodiment of the invention, embodiments of the present invention include a modular intelligent electronic overload system. The system comprises a control module, a communication module, a configuration tool, and a user interface device. The control module having a memory device, the memory device configured to store at least a plurality of function blocks, a configuration file, and a plurality of status bits; the communication module in electrical communication with the control module; the configuration tool configured to allow a user to select at least one of a plurality of parameters, wherein the configuration tool sets the plurality of status bits to correspond with the at least one of the plurality of parameters selected by the user; the configuration tool further configured to be used by a user to select a single function block from the plurality of function blocks; and the user interface device being electrically coupled to the control module, the user interface having a memory device, the user interface memory device configured to copy the plurality of parameters located in the control module memory device To the accomplishment of the foregoing and related ends, the embodiments, then, comprise the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

The embodiments will hereafter be described with reference to the accompanying drawings, wherein like reference numerals denote like elements, and.

DETAILED DESCRIPTION OF THE INVENTION

Figure 1:
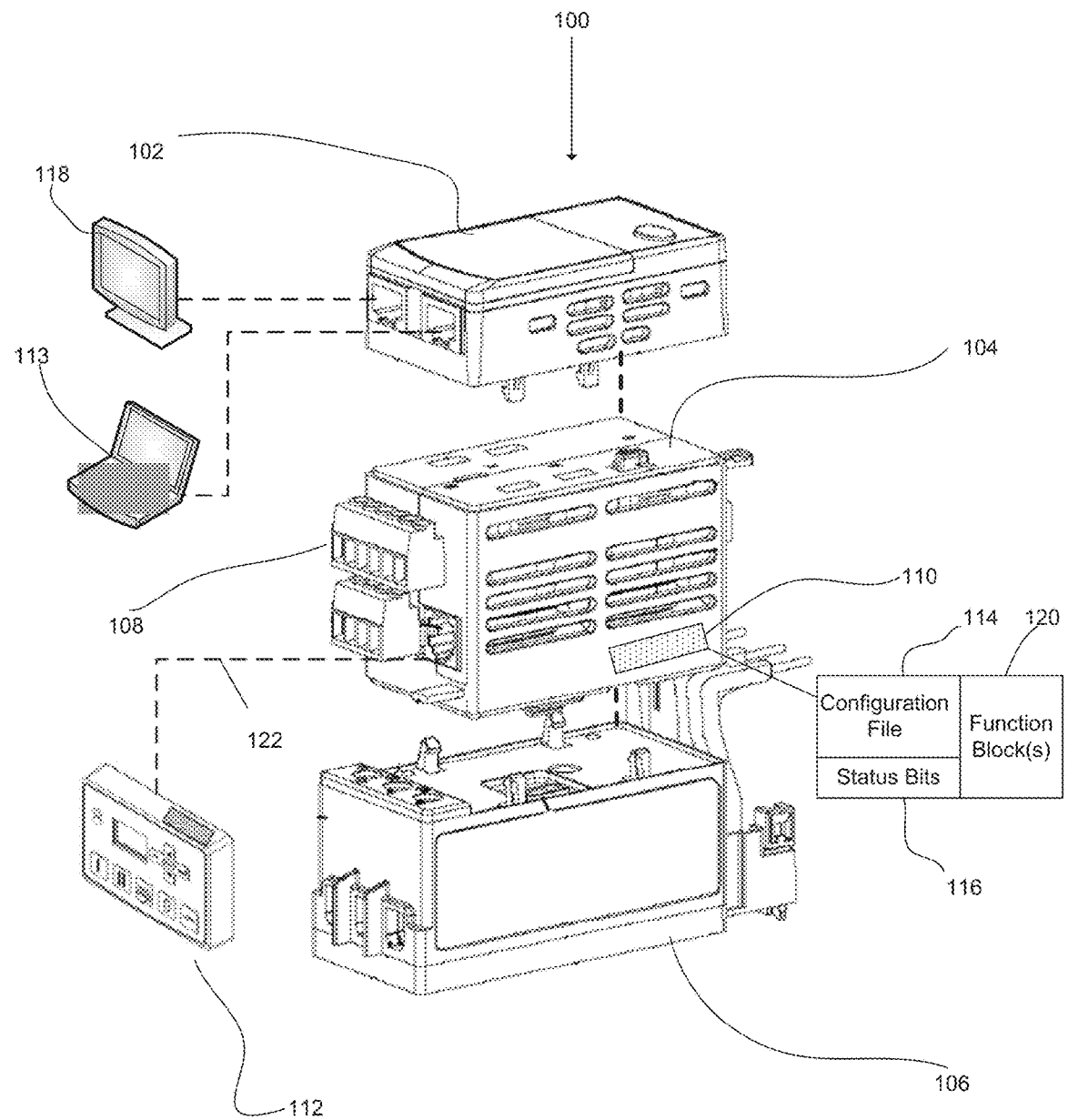
FIG. 1 is a perspective exploded view of a modular intelligent electronic overload device, according to embodiments of the present invention.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein.

The detailed description is to be read with reference to the figures. The figures depict selected embodiments and are not intended to limit the scope of embodiments of the invention. Skilled artisans will recognize the examples provided herein have many useful alternatives and fall within the scope of embodiments of the invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

Embodiments of the invention may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., digital signal processing elements, logic elements, diodes, etc., which may carry out a variety of functions under the control of one or more processors or other control devices. Other embodiments may employ program code, or code in combination with other circuit components.

The various embodiments of the invention will be described in connection with a modular intelligent electronic overload device adapted to couple to an electromagnetic contactor. That is because the features and advantages of the invention are well suited for this purpose. Still, it should be appreciated that the various aspects of the invention can be applied in other overload device configurations, not necessarily modular, and that are capable of stand-alone operation or that can be coupled to other devices, including solid state contactors.

Specifically, embodiments of the invention provide a modular intelligent electronic overload device capable of providing multiple functions. A first portion of the modular intelligent electronic overload device can be a sensing module having a first housing supporting integrated phase current conductors and load side power terminals. The integrated phase current conductors conduct load current from the contactor (line side of the modular intelligent electronic overload device) through the modular intelligent electronic overload device to the load side terminals, and current sensing devices and associated sensing circuitry monitors the current in the phase current conductors to produce a signal proportional to the current. The sensing module includes a sensing module electrical connector extending from a front side of the first housing and communicating with the sensing module circuitry.

A second portion of the modular intelligent electronic overload device can be a control module having a second housing attachable to the front side of the sensing module. The control module can include a front side electrical connector located on a front side of the control module and a back side electrical connector located on a back side of the control module. The back side electrical connector can mate with the sensing module electrical connector when the control module is coupled to the front side of the sensing module housing. Circuitry within the control module can communicate with the sensing module circuitry to augment its function. The control module can also contain a memory storage for storing information in the control module. The second housing of the control module can include terminals providing an interface for power and input and output signals.

A third portion of the modular intelligent electronic overload device can be a communication module having a third housing attachable to the front side of the control module. The control module electrical connector located on the front side of the control module can mate with a communication module electrical connector when the communication module is coupled to the front wall of the control module housing. Circuitry within the communication module can communicate with the control module circuitry and the sensing module circuitry to augment its function. Use of the communication module to provide an optional network connection to an overload relay can reduce the cost of the sensing module and/or control module.

In this configuration, a physical separation of functions of the modules can be incorporated into many electronic devices, including a modular intelligent electronic overload device, allowing a variety of electronic overload devices of different functions to be offered in a cost-effective basis. The electrical connectors between the modules allows division of functions to be accomplished with minimal interface cost.

Any of the circuitry described herein can provide functions including motor jam detection, current imbalance detection, and ground fault current detection, for example. The circuitry can provide remote reset or trip of the overload relay. Embodiments of the invention can provide remote resetting as an optional feature, thereby reducing the cost of the modular intelligent electronic overload device.

Any of the modular intelligent electronic overload devices described herein can be configured with a variety of parameters. These parameters may include, but are not limited to, current ranges, allowable overload percentages, communication protocols, phase imbalance tolerance, etc.

Turning now to the figures, FIG. 1 shows an exploded view of a modular intelligent electronic overload device 100. In one embodiment, the modular intelligent electronic overload device 100 can have a modular design and can be comprised of a communication module 102, a control module 104 and a sensing module 106. The control module 104 can have input/output (hereinafter "I/O") connections 108 that can be used for interfacing the modular intelligent electronic overload device 100 with other devices. In one embodiment, the I/O 108 can be configured by a user. The control module 104 can also contain at least one memory device 110. The memory device 110 can be volatile or non-volatile. The communication module 102 can interface to the modular intelligent electronic overload device 100 with various network protocols. Example protocols that the communication module 102 can interface with can be EthernetIP, DeviceNet, Profibus or other network protocols for use in the required application. The sensing module 106 can be used to sense a current flow in a motor application. Furthermore, in one embodiment the sensing module 106 and the communication module 102 can both electrically communicate with the control module 104 and vice versa.

Due to the above mentioned modular aspect of the modular intelligent electronic overload device described herein, many combinations of modules with multiple options can be provided to a user. This can result in a manufacturer being required to develop, and make available to end users, multiple intelligent device configuration files. An example intelligent device configuration file can be an Electronic Data Sheet ("EDS") file for use on a LOGIX based control system from Rockwell Automation. An EDS file can contain all the options and parameters for an intelligent device and it can often be required to have an EDS file for each unique intelligent device. Users can access EDS files for downloading into a modular intelligent electronic overload device 100 or other intelligent device in multiple ways. For example, EDS files might be accessed via an internet web site, a CD-ROM, a flash memory, or other device or protocol suitable for data transmission. Furthermore, in some control systems, a visualization device 118 may be utilized to view and configure intelligent system components such as a modular intelligent electronic overload device 100. A visualization device 118 may be a PANELVIEW from Rockwell Automation or other visualization device 118. The visualization device 118 may require a specific visualization configuration file to be able to adequately interface with an intelligent device. This visualization configuration file may be a "Faceplate" type file as used in LOGIX based control system from Rockwell Automation. A unique visualization configuration file may be required for each unique intelligent device configuration file 114.

Figure 2:
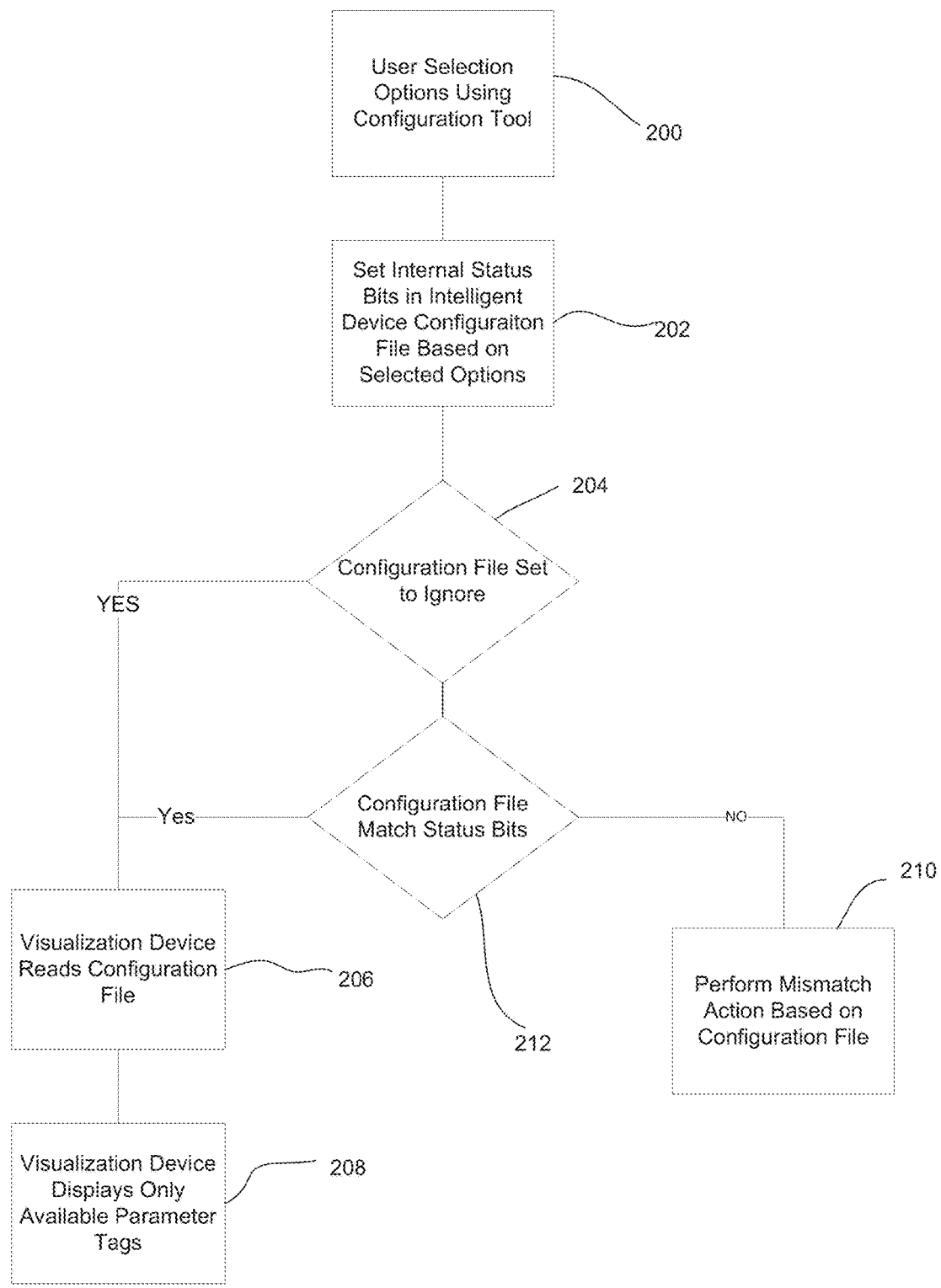
FIG. 2 is a process flow-chart illustrating the configuration of a modular intelligent electronic overload device.

FIG. 2 illustrates an embodiment of the described technology which allows for a single intelligent device configuration file 114. A user can configure a new intelligent device using a configuration tool 112, 113. The configuration tool 113 can be a computer program capable of being executed on a personal computer. Alternatively, the configuration tool 112 can be embedded in a specific device for configuring intelligent devices. In one embodiment, the configuration tool 112 can utilize a dedicated communication link 122 to the intelligent device. In one embodiment, the intelligent device is a modular intelligent electronic overload device 100. The modular intelligent electronic overload device 100 can have multiple options. These options can include, but are not limited to, communication module 102 types, sensing module 106 types, additional I/O modules, and user interface devices, among others.

Returning to FIG. 2, at process block 200 a user can select the options that are installed on the modular intelligent electronic overload device 100 using the configuration tool 112, 113. The configuration tool 112, 113 can communicate the selected options to a configuration file 114 for the modular intelligent electronic overload device 100. In one embodiment, the configuration file 114 can be embedded in the memory device 110 of the control module 104 of the modular intelligent electronic overload device 100. The configuration file 114 can contain a plurality of status bits 116 that correspond to each unique option available for the modular intelligent electronic overload device 100. In another embodiment, the status bits 116 can be separate from the configuration file 114. In some embodiments, the status bits can 116 can be contained in the real-time data presented to the modular intelligent electronic overload device. At process block 202, the configuration file 114 can set the plurality of status bits 116 that correspond to the selected options of the modular intelligent electronic overload device 100. At process block 204, the modular intelligent electronic overload device 100 can determine if the configuration file 114 has been set to ignore the plurality of status bits 116. At process block 212, the modular intelligent electronic overload device 100 can periodically evaluate if each of the unique options are present on the modular intelligent electronic overload device 100. In one embodiment, the control module 104 can perform the periodic checking to determine if other options are installed. In other embodiments the configuration tool 112, 113 can perform the periodic checking.

In one embodiment, at process block 204, the modular intelligent electronic overload device 100 can compare the options selected in the configuration file 114 to the plurality of status bits 116. At process block 210, if the configuration file 114 does not match the plurality of status bits 116, the intelligent electronic overload device 100 can perform an appropriate mismatch action based on the configuration file 114 not matching the plurality of status bits. In one embodiment, the mismatch action can be to ignore the mismatch. In a further embodiment the mismatch action can be to trip the modular intelligent electronic overload device 100. In yet a further embodiment, the mismatch action can be to have the modular intelligent electronic overload device 100 present a warning to a user. In one embodiment, the warning can be displayed by the modular intelligent electronic overload device 100. In further embodiments the warning can be presented via a user interface device 310. In other embodiments, the warning can be presented via a visualization device 118.

At process block 212 if the configuration file 114 matches the plurality of status bits 116 the intelligent electronic overload device 100 can command the visualization device 118 to read the plurality of status bits 116. In another embodiment, at process block 204, if the configuration file 114 is set to ignore the plurality of status bits 116, the intelligent electronic overload device 100 can command the visualization device 118 to read the plurality of status bits 116. The visualization device 118 can contain a generic display file for an intelligent device such as a modular intelligent electronic overload device 100. At process block 206, when the visualization device 118 reads the plurality of status bits 116, the visualization device 118 can display only those parameter tags 208 that are available in the modular intelligent electronic overload device 100, based on the status bits 116. The visualization device 118 can also allow a user to modify writeable parameters of the modular intelligent electronic overload device 100 based on status bits 116 in the configuration file 114. At process block 210, where a visualization device 118 is not connected to the modular intelligent electronic overload device 100, the bits contained in the configuration file 114 that correspond to non-selected options can be masked. This masking can allow a single configuration file 114 to be used for the modular intelligent overload device 100 with multiple options. The masking of the bits associated with the non-selected options can allow the user to be able to have access only to parameters that are available for the selected options contained in the modular intelligent electronic overload device 100 when configuring the device for the application.

Once the configuration parameters have been selected, the parameters can be stored in the memory device 110 of the control module 104 of the modular intelligent electronic overload device 100. However, when a modular intelligent electronic overload device 100 is required to be replaced, or, when the control module 104 containing the configuration file 114 is replaced, a user may not have a configuration tool available to configure the replacement modular intelligent electronic overload device 100. As such, this technology presents a system and method to store the configuration file 114 in a separate device that can be accessed by a modular intelligent electronic overload device 100 without the need for a configuration tool such as a personal computer or other dedicated programming device.

Figure 3:
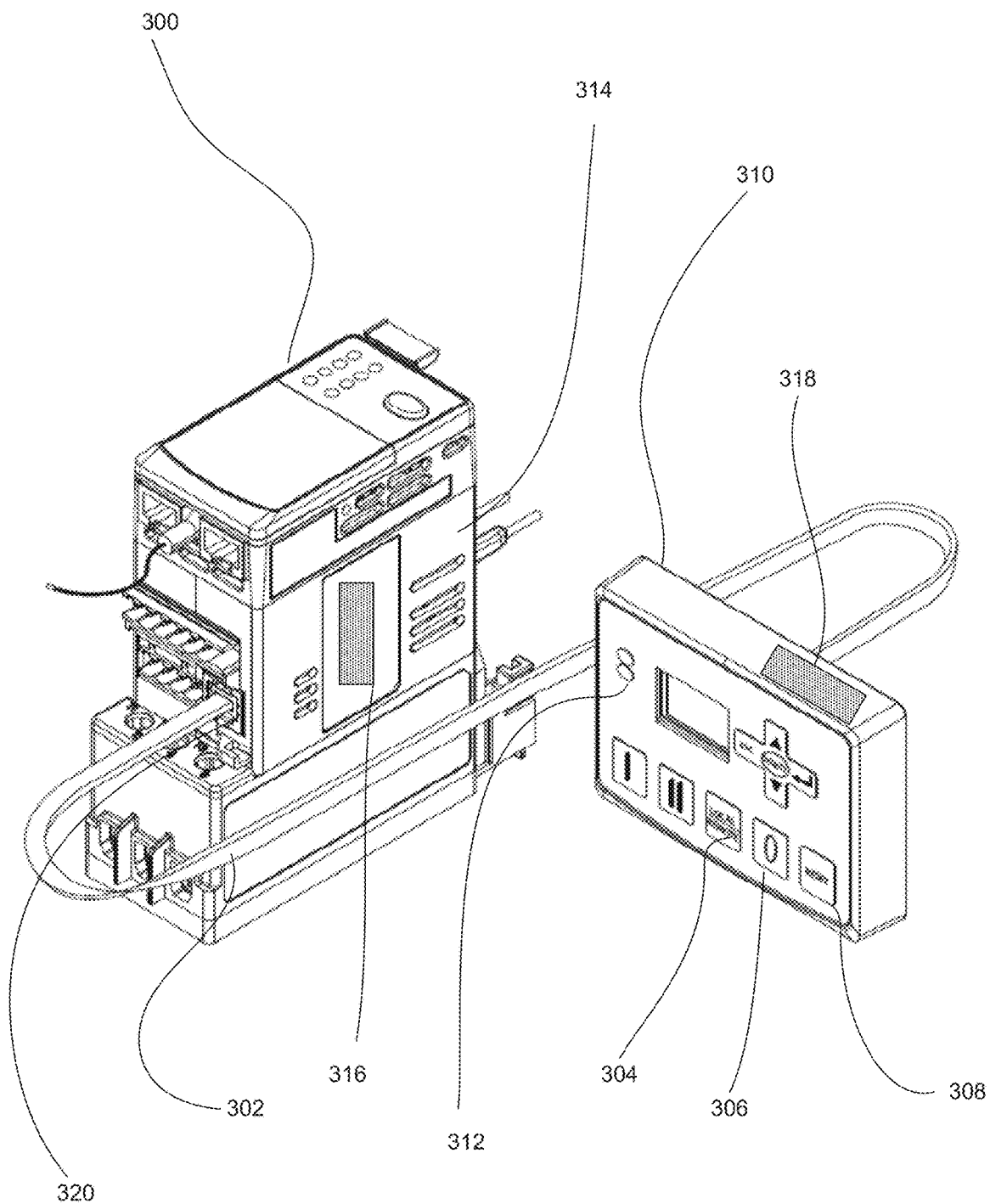
FIG. 3 is a perspective view of a modular intelligent electronic overload device coupled to a user interface device.

Turning to FIG. 3, an embodiment illustrating off-device storage can be seen. FIG. 3 contains a modular intelligent electronic overload device 300 and a user interface device 310. The user interface device can be a device such as an E300 or E200 type operator station from Rockwell Automation. The modular intelligent electronic overload device 300 and the user interface device 310 can be electronically connected via a communication link 302. The communication link 302 can be established using a communication port 320 in a control module 314 of the modular intelligent electronic overload device 300. The modular intelligent electronic overload device 300 and the user interface device 310 can communicate via the communication link 302 using a communication protocol. In an exemplary embodiment, this communication protocol can be a two-wire serial communication protocol. In other embodiments, the communication protocol can be a version of DEVICELOGIX from Rockwell Automation. However, any communication protocol known in the art could be also used.

Once the modular intelligent electronic overload device 300 has been configured, a user interface device 310 can be connected to the modular intelligent electronic overload device 300. In some embodiments the user interface device 310 can be an E300 operator station from Rockwell Automation. The user interface device 310 can contain a memory device 318. The user interface device 310 can also contain multiple user input devices 304-308. In one embodiment, a user can then actuate a first user input device 304 and a second user input device 306 simultaneously for a pre-determined time, although other methods of actuation are possible. In one embodiment, the pre-determined time can be three seconds, although more or less time is contemplated. Once the first user input device 304 and the second user input device 306 device have been actuated for the pre-determined time, the user interface device 310 can transmit a write command to the modular intelligent electronic overload device 300. The modular intelligent electronic overload device 300, receiving the write command from the user interface device 310, can transmit a set of writeable configuration parameters to the user interface device 310. The user interface device 310 can then store the modular intelligent overload device 300 configuration parameters in the memory device 318. In one embodiment, the user interface device 310 can store an identical copy of the configuration parameters stored in the modular intelligent overload device 300. In one embodiment the writeable configuration parameters can be a plurality of function blocks 120.

The user interface device 310 may also contain a user feedback device 312. In one embodiment, the user feedback device 312 can be an LED. In another embodiment, the user feedback device 312 can be a multi-color LED. In other embodiments, a plurality of LEDs can be used. In one embodiment, the user feedback device 312 can communicate the status of the user interface device 310 receiving the configuration parameters from the modular intelligent electronic overload device 300. The user feedback device 312 can communicate that the modular intelligent electronic overload device 300 is writing configuration parameters to the user feedback device 312. In some embodiments, the user feedback device can blink between alternating colors to indicate that the modular intelligent overload device 300 is writing configuration parameters to the user feedback device 312. In other embodiments, the user feedback device 312 can present a first flashing color to the user to indicate that the configuration parameters were successfully written to the user interface device 310. The user feedback device 312 can present a second flashing color to the user to indicate that the configuration parameters were not successfully written to the user interface device 310.

If, after the configuration parameters were successfully written to the user interface device 310, a user replaces the modular intelligent electronic overload device 300 or the control module 314 of the modular intelligent electronic overload device 300, the configuration parameters stored on the user interface device 310 can be accessed by the replacement modular intelligent electronic overload device 300. This can eliminate the requirement that a user have a separate configuration tool available to configure the replacement modular intelligent electronic overload device 300 or control module 314.

In some embodiments, to direct the modular intelligent electronic overload device 300 to access the configuration parameters stored in the memory device 318 of the user interface device 310, the user can actuate the second user input device 306 and a third user input device 308 simultaneously for a pre-determined time, although other methods of actuation are possible. In one embodiment, the pre-determined time can be three seconds, although more or less time is contemplated. Once the second user input device 306 and the third user input device 308 device have been actuated for the pre-determined time, the user interface device 310 can transmit a read command to the modular intelligent electronic overload device 300 over the communication link 302. The modular intelligent electronic overload device 300, receiving the read command from the user interface device 310, can access the memory device 318 of the user interface device 310 via the communication link 302. The modular intelligent electronic overload device 300 can then write the configuration parameters located in the user interface device memory device 318 to a memory device 316 of the modular intelligent electronic overload device 300. The memory device 316 can be contained in the control module 314. The user feedback device 312 can communicate that the modular intelligent electronic overload device 300 is accessing configuration parameters from the user interface device 312. In another embodiment, the user feedback device 312 can alternately illuminate between multiple colors to indicate that the modular intelligent electronic overload device 300 is accessing configuration parameters from the user interface device 310. In other embodiments, the user feedback device 312 can present a first flashing color to the user to indicate that the configuration parameters were successfully accessed from the user interface device 310 by the modular intelligent electronic overload device 300. The user feedback device 312 can present a second flashing color to the user to indicate that the configuration parameters were not successfully accessed by the modular intelligent electronic overload device 300.

Intelligent devices such as a modular intelligent electronic overload device 100 are often used in industrial applications. As such, modular intelligent electronic overload devices can be applied in different types of industrial control applications. Often, these industrial applications are controlled using industrial type control systems which can run sophisticated industrial automation software, such as DEVICE LOGIX from Rockwell Automation. As industrial automation systems become more reliant on networked devices, the ability to utilize a product such as a modular intelligent electronic overload device 100 as a remote I/O device and/or control module is beneficial to the end user. While prior intelligent electronic overload devices have been capable of being programmed by a user to perform certain functions based on their application, this required a user who was skilled in programming industrial automation devices. Additionally, specific programming software and configuration tools were also required. This programming was conducted using functional blocks and/or ladder logic programs for use in an industrial automation architecture such as DEVICE LOGIX from Rockwell Automation.

Figure 4:
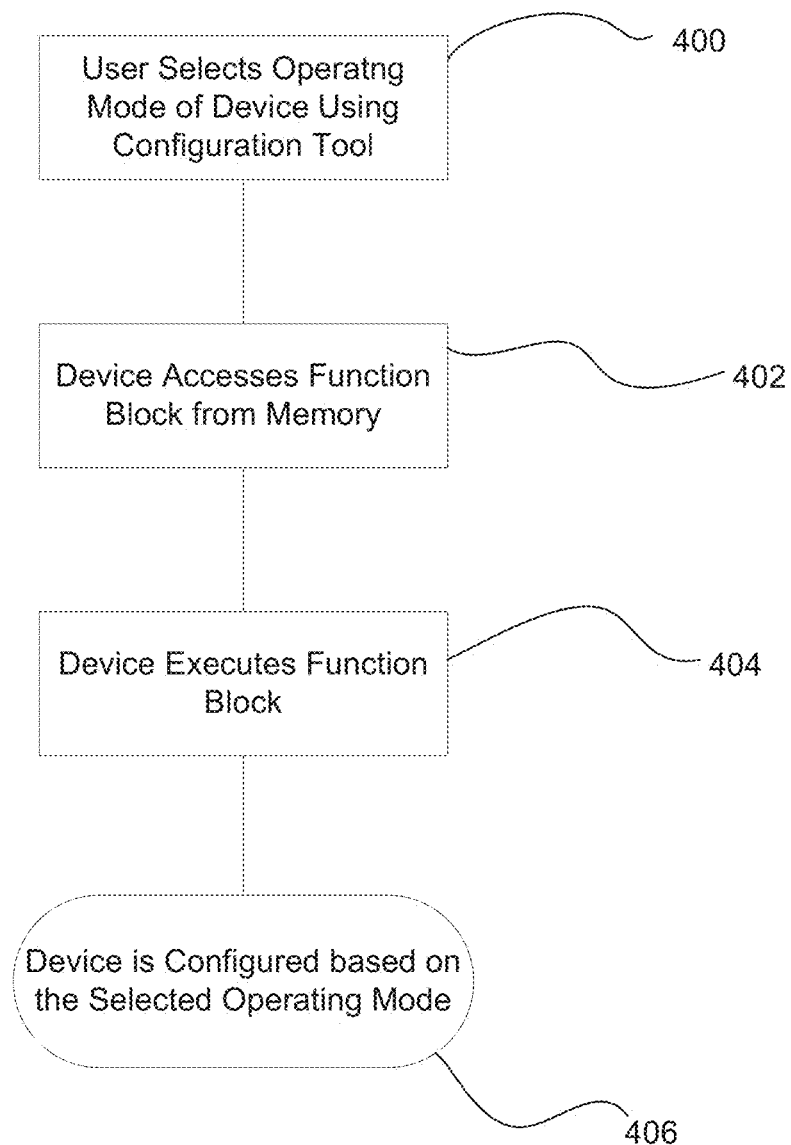
FIG. 4 is a process flow-chart illustrating the process of configuring a modular intelligent electronic overload device based on a selected operating mode.

The present technology addresses this issue by embedding certain commonly used function blocks 120 into the memory device 110 of a modular intelligent electronic overload device 100. These function blocks 120 can be stored in the memory device 110 of the control module 104 of the modular intelligent electronic overload device 100. As can be seen in process block 400 of FIG. 4, to configure the modular intelligent electronic overload device 100 to operate in a desired mode, a user can select an operating mode for the modular intelligent electronic overload device 100 using a configuration tool 112, 113. The operating modes available to the user can correspond to the available function blocks 120 stored in the memory device 110 of the modular intelligent electronic overload device 100. These function blocks 120 can correspond to commonly used industrial control applications or "personalities." A modular intelligent electronic overload device 100 can contain up to one-hundred unique function blocks. Example personalities can include Non-reversing Three Wire Starters, Reversing Two Wire Starters, Reversing Two Wire Starter with Feedback, etc. The provided examples are meant for illustrative purposes only and should not be considered limiting.

In process block 402, after the user selects the operating mode of the device, the modular intelligent electronic overload device 100 can access the corresponding function block 120 the memory device 110. Further, in process block 404 the modular intelligent electronic overload device 100 can execute the function block 120. Finally, in process block 406, the modular intelligent electronic overload device 100 can be configured to correspond with the selected operating mode. Further, where the modular intelligent electronic overload device 100 is configured, an I/O 108 can be configured to correspond with the default I/O conditions for the selected operating mode. The I/O 108 can be contained in the control module 104. The default I/O configurations can be provided to the user in a user manual. The default I/O configurations can also be provided to the user via the configuration tool; however, other methods of providing the default I/O configurations to the user are possible.

Figure 5:
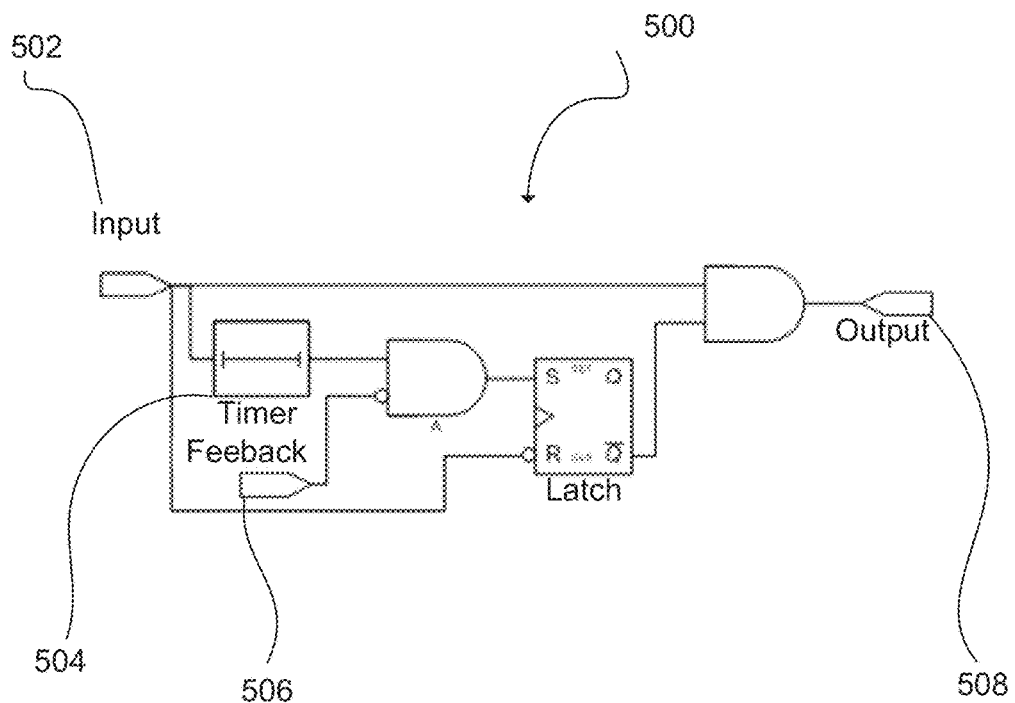
FIG. 5 is an exemplary schematic view of an embedded function block.

FIG. 5 provides an exemplary function block embodiment of a non-reversing two-wire starter, with feedback personality 500. The exemplary personality 500 can have two inputs 502, 506. The exemplary personality 500 can also control one output 508. When a true condition is applied to the input 502, the output 508 can be set to true and a timer 504 can begin. When the timer 504 expires, the timer 504 output condition can be set to true. If the timer 504 expires prior to the feedback input 506 being true, then the output 508 can be set back to false. The timer 504 can have a preset duration. A user can also configure the timer duration. In a non-limiting example, the timer 504 duration can be in a range from one to seventy-thousand milliseconds. When a false condition is applied to the input 502, the output 508 can immediately change to a false condition. The modular intelligent electronic overload device 100 can configure the on-board I/O 108 to correspond to inputs 502, 506 and output 508.

In some embodiments, the modular intelligent electronic overload device 100 can configure the I/O 108 to correspond to the inputs and outputs of the selected operating mode personality based on default assignments. Also, in another embodiment, a user can modify the default I/O assignment values for a selected operating mode personality using the configuration tool 113. In another embodiment, the user can also modify all parameters of the embedded function blocks 120 using the configuration tool 113. In another preferred embodiment, the embedded function blocks 120 are stored in the memory device 110 of the control module 104 of a modular intelligent electronic overload device 100.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Finally, it is expressly contemplated that any of the processes or steps described herein may be combined, eliminated, or reordered. Accordingly, this description is meant to be taken only by way of example, and not to otherwise limit the scope of this invention.

We claim:

1. A modular intelligent electronic overload system, the system comprising:
   a control module;
   a communication module;
   the control module having an input-output device and a memory device, the memory device containing a plurality of function blocks, wherein each of the plurality of function blocks corresponds to one of a plurality of predefined operating modes, each of the plurality of predefined operating modes having a predefined input-output configuration;
   the communication module in electrical communication with the control module; and
   the communication module additionally in electrical communication with a configuration tool, wherein the configuration tool is configured to allow a user to select a single function block from the plurality of function blocks to configure the modular intelligent overload system to operate in the selected one of the plurality of predefined operating modes, and to configure the input-output device to correspond to the selected one of the plurality of predefined operating modes.

2. The system of claim 1, wherein the plurality of function blocks are commonly used function blocks used in an industrial automation environment.

3. The system of claim 2, wherein the industrial automation environment is a DEVICE LOGIX environment.

4. The system of claim 1, and further comprising an external memory device, the external memory device capable of storing a copy of the function blocks stored in the control module memory device.

5. The system of claim 4, wherein the external memory device is located on a user interface device electrically coupled to the electronic overload device.

6. The system of claim 4, wherein the external memory device is located on a user interface device electrically coupled to the control module.

7. The system of claim 1, wherein the configuration tool is in electronic communication with the communication module.

8. The system of claim 1, the system further comprising a graphical user interface device.

9. A modular intelligent electronic overload system, the system comprising:
    a control module;
    a communication module;
    a configuration tool;
    a user interface device;
    the control module having a memory device, the memory device configured to store at least a plurality of function blocks, a configuration file, and a plurality of status bits;
    the communication module in electrical communication with the control module;
    the configuration tool configured to allow a user to select at least one of a plurality of parameters, wherein the configuration tool sets the plurality of status bits to correspond with the at least one of the plurality of parameters selected by the user;
    the configuration tool further configured to be used by a user to select a single function block from the plurality of function blocks; and
    the user interface device being electrically coupled to the control module, the user interface having a memory device, the user interface memory device configured to copy the plurality parameters stored in the control module memory device.

10. The system of claim 9, wherein the configuration file can be configured to ignore the plurality of status bits.

11. The system of claim 9, wherein the configuration tool is in electronic communication with the control module.

12. The system of claim 9, wherein the system can compare the configuration file to the plurality of status bits and further wherein the system can perform a mismatch action if a difference is detected between the configuration file and the plurality of status bits.

13. The system of claim 9, wherein the plurality of function blocks are commonly used function blocks used in an industrial automation environment.

14. The system of claim 13, wherein the industrial automation environment is a DEVICE LOGIX environment.

15. The system of claim 9, wherein the configuration file can mask a plurality of status bits corresponding to the at least one of the plurality of parameters that were not selected by the user.

16. The system of claim 9, wherein the configuration tool is in electronic communication with the communication module.

17. The system of claim 9, wherein the user interface device can receive a plurality of status bits and display parameters associated with the received plurality of status bits.

18. The system of claim 17, wherein the user interface device continuously monitors the received plurality of status bits.

19. The system of claim 9, wherein the at least one of the plurality of parameters selected by the user corresponds to options installed on the intelligent electronic overload system.

* * * * *